US012695171B2

(12) United States Patent
Blauert

(10) Patent No.: US 12,695,171 B2
(45) Date of Patent: Jul. 28, 2026

(54) ANTENNA ASSEMBLY INCLUDING TWO-DIMENSIONAL SURFACE WAVE FED ARRAY FOR AZIMUTH GAIN CONTROL

(71) Applicant: Aptiv Technologies AG, Schaffhausen (CH)

(72) Inventor: John Karl Blauert, Westfield, IN (US)

(73) Assignee: Aptiv Technologies AG, Schaffhausen (CH)

( * ) Notice: Subject to any disclaimer, the term of this patent is extended or adjusted under 35 U.S.C. 154(b) by 141 days.

(21) Appl. No.: 18/420,183

(22) Filed: Jan. 23, 2024

(65) Prior Publication Data

US 2025/0239755 A1 Jul. 24, 2025

(51) Int. Cl.
*H01Q 1/22* (2006.01)
*H01Q 13/02* (2006.01)

(52) U.S. Cl.
CPC ....... *H01Q 1/2283* (2013.01); *H01Q 13/0233* (2013.01)

(58) Field of Classification Search
None
See application file for complete search history.

(56) References Cited

U.S. PATENT DOCUMENTS

| | | | | |
|---|---|---|---|---|
| 2020/0313304 | A1* | 10/2020 | Glogowski | H01Q 21/0037 |
| 2023/0036066 | A1 | 2/2023 | Bencivenni et al. | |
| 2023/0083196 | A1* | 3/2023 | Yoo | H01Q 21/005 343/767 |
| 2023/0420857 | A1* | 12/2023 | Garcia Tejero | G01S 7/027 |

FOREIGN PATENT DOCUMENTS

| | | | | |
|---|---|---|---|---|
| CN | 116093582 | A | 5/2023 | |
| DE | 102020201268 | A1 * | 8/2021 | H01Q 17/00 |
| JP | 6686820 | B2 * | 4/2020 | |
| KR | 102464791 | B1 | 11/2022 | |

OTHER PUBLICATIONS

Extended European Search Report regarding European Patent Application No. 24211506.1, dated May 13, 2025.
Huang et al., "The Rectangular Waveguide Board Wall Slot Array Antenna Integrated with One Dimensional Subwavelength Periodic Corrugated Grooves and Artificially Soft Surface Structure," International Journal of Infrared and Millimeter Waves, Kluwer Academic Publishers-Plenum Publishers, NE, vol. 30, No. 4, Dec. 20, 2008.

* cited by examiner

*Primary Examiner* — Dameon E Levi
*Assistant Examiner* — Anh N Ho
(74) *Attorney, Agent, or Firm* — Harness, Dickey & Pierce, P.L.C.

(57) ABSTRACT

An antenna assembly including: a circuit board with an integrated circuit configured to process a radio frequency (RF) signal; a waveguide plate including a waveguide configured to guide the RF signal at least one of to and from a conductive trace extending from the integrated circuit; and a conductive top plate over the waveguide plate. The conductive top plate includes: an outer surface and an inner surface facing the waveguide plate; a plurality of slots aligned with the waveguide and aligned along the conductive top plate in a Y-direction; and cavities defined by the conductive top plate and recessed below the outer surface of the conductive top plate. A row of the cavities is beside the plurality of slots. The cavities of the row are aligned in the Y-direction parallel to the plurality of slots and spaced apart in the Y-direction.

20 Claims, 11 Drawing Sheets

ANTENNA ASSEMBLY INCLUDING TWO-DIMENSIONAL SURFACE WAVE FED ARRAY FOR AZIMUTH GAIN CONTROL

FIELD

The present disclosure relates to an antenna assembly including a two-dimensional surface wave fed array for azimuth gain control.

BACKGROUND

This section provides background information related to the present disclosure, which is not necessarily prior art.

Radar uses electromagnetic signals to detect and track objects. The electromagnetic signals are transmitted and received using one or more antennas. An antenna may be characterized in terms of gain and beam width, or more specifically pattern, which is a measure of the gain as a function of direction. By modifying the antenna pattern, the antenna may be customized for a specific application.

SUMMARY

This section provides a general summary of the disclosure, and is not a comprehensive disclosure of its full scope or all of its features.

The present disclosure provides for, in various features, an antenna assembly including: a circuit board including an integrated circuit configured to process a radio frequency (RF) signal, and a conductive trace extending from the integrated circuit; a waveguide plate over the circuit board, the waveguide plate including a waveguide configured to guide the RF signal at least one of to and from the conductive trace; and a conductive top plate over the waveguide plate. The conductive top plate includes: an outer surface and an inner surface facing the waveguide plate, the outer surface is opposite to the inner surface; a plurality of slots aligned with the waveguide and extending through the conductive top plate, the plurality of slots aligned along the conductive top plate in a Y-direction; and cavities defined by the conductive top plate and recessed below the outer surface of the conductive top plate, a row of the cavities is beside the plurality of slots, the cavities of the row are aligned in the Y-direction parallel to the plurality of slots and spaced apart in the Y-direction.

In further features, the row of the cavities is a first row on a first side of the plurality of slots, and the antenna assembly further includes a second row of the cavities on a second side of the plurality of slots that is opposite to the first side, the cavities of the second row are aligned in the Y-direction parallel to the plurality of slots and spaced apart in the Y-direction.

In further features, the cavities are spaced apart in the Y-direction at a pitch of 3.2 mm.

In further features, the row of the cavities is one of a plurality of first rows of the cavities on a first side of the plurality of slots, the plurality of first rows are spaced apart in an X-direction that is perpendicular to the Y-direction, and the antenna assembly further includes a plurality of second rows of the cavities on a second side of the plurality of slots that is opposite to the first side, the plurality of second rows are spaced apart in the X-direction that is perpendicular to the Y-direction.

In further features, the plurality of first rows are spaced apart in the X-direction at a pitch of 3.3 mm.

In further features, a first trough is between two of the plurality of first rows, the first trough extending in the Y-direction.

In further features, the plurality of first rows are spaced apart in the X-direction at a pitch of 2.75 mm.

In further features, the first trough has a length in the Y-direction of 23 mm, a width in the X-direction of 0.8 mm, and a depth in a Z-direction of 0.4 mm.

In further features, a second trough is between two of the plurality of second rows, the second trough extending in the Y-direction.

In further features, the cavities of each one of the plurality of first rows are spaced apart in the Y-direction, and the cavities of each one of the plurality of second rows are spaced apart in the Y-direction.

In further features, each one of the cavities has a length in the Y-direction, a width in an X-direction that is perpendicular to Y-direction, and a depth in a Z-direction, the length is greater than the width, and the depth is less than the length and greater than the width.

In further features, the waveguide is a first waveguide and the plurality of slots is a first plurality of slots, the conductive top plate further includes a second plurality of slots aligned parallel to the first plurality of slots in the Y-direction over a second waveguide of the waveguide plate, and an additional row of the cavities is beside the second plurality of slots, the cavities of the additional row are aligned in the Y-direction parallel to the second plurality of slots and spaced apart in the Y-direction.

The present disclosure also provides for, in various features, an antenna assembly including: a circuit board including an integrated circuit configured to process a radio frequency (RF) signal, and a conductive trace extending from the integrated circuit; a waveguide plate over the circuit board, the waveguide plate including a waveguide configured to guide the RF signal at least one of to and from the conductive trace; and a conductive top plate over the waveguide plate. The conductive top plate includes: an outer surface and an inner surface facing the waveguide plate, the outer surface is opposite to the inner surface; a plurality of slots aligned with the waveguide and extending through the conductive top plate, the plurality of slots aligned along the conductive top plate in a Y-direction; and cavities defined by the conductive top plate and recessed below the outer surface of the conductive top plate, rows of the cavities are beside the plurality of slots on opposite sides of the plurality of slots, the cavities of each one of the rows are aligned in the Y-direction parallel to the plurality of slots and spaced apart in the Y-direction, the rows are spaced apart in an X-direction that is perpendicular to the Y-direction, each slot of the plurality of slots is unaligned with the cavities in the X-direction.

In further features, the cavities are spaced apart in the Y-direction at a pitch of 3.2 mm.

In further features, each one of the cavities has a length in the Y-direction, a width in an X-direction that is perpendicular to Y-direction, and a depth in a Z-direction, the length is greater than the width, and the depth is less than the length and greater than the width.

In further features, the length is more than twice the width.

The present disclosure further provides for, in various features, an antenna assembly including: a circuit board including an integrated circuit configured to process a radio frequency (RF) signal, and a conductive trace extending from the integrated circuit; a waveguide plate over the circuit board, the waveguide plate including a waveguide configured to guide the RF signal at least one of to and from the conductive trace; and a conductive top plate over the waveguide plate. The conductive top plate includes: an outer surface and an inner surface facing the waveguide plate, the outer surface is opposite to the inner surface; a plurality of slots aligned with the waveguide and extending through the conductive top plate, the plurality of slots aligned along the conductive top plate in a Y-direction; cavities defined by the conductive top plate and recessed below the outer surface of the conductive top plate, rows of the cavities are beside the plurality of slots, the cavities of each one of the rows are aligned in the Y-direction parallel to the plurality of slots and spaced apart in the Y-direction, and each one of the rows is spaced apart in an X-direction that is perpendicular to the Y-direction; and troughs defined by the conductive top plate and recessed below the outer surface of the conductive top plate, each one of the troughs extends in the Y-direction and is between adjacent ones of the rows of the cavities.

In further features, the rows of the cavities are spaced apart in the X-direction at a pitch of 2.75 mm.

In further features, each one of the troughs has a length in the Y-direction of 23 mm, a width in the X-direction of 0.8 mm, and a depth in a Z-direction of 0.4 mm.

In further features, the rows of the cavities are on opposite sides of the plurality of slots.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure includes an antenna with a conductive outer plate defining a plurality of cavities adjacent to slots of the antenna. In some applications, the conductive outer plate may further define parasitic bridges in the form of troughs between rows of the cavities. The cavities and troughs are configured as described herein to control surface waves of radiation emanating from, and flowing to, the slots of the antenna to enhance gain of the antenna. The dimensions of the cavities and troughs may be customized to generate a radiation pattern of a custom width and total gain to fit any suitable application. For example, the depth, length, and width of each cavity and trough may be varied, and the spacing between the cavities and troughs may be varied, to customize the radiation pattern as described in detail herein.

Figure 1:
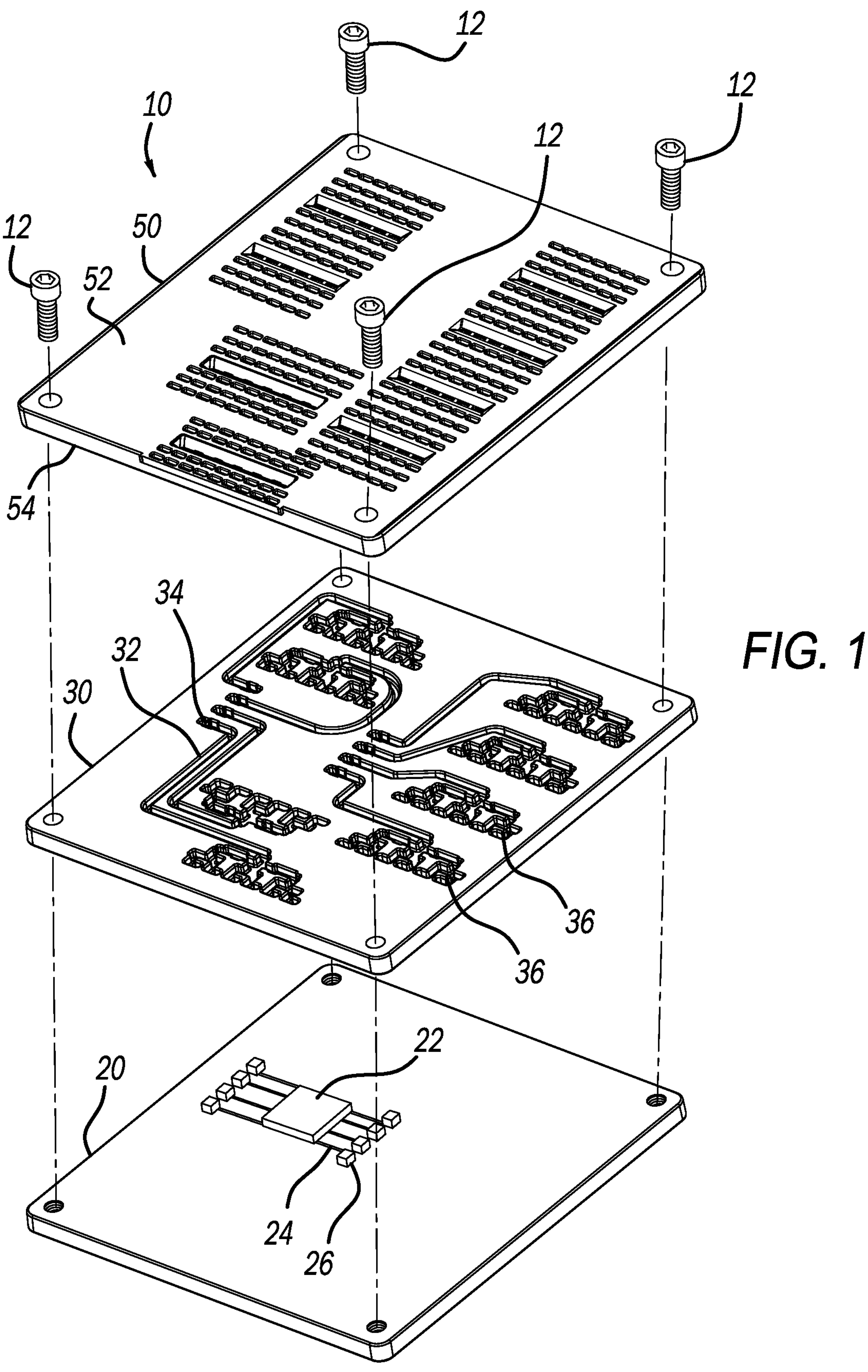
FIG. 1 is an exploded view of an antenna assembly in accordance with the present disclosure.

FIG. 1 illustrates an exemplary antenna assembly 10 in accordance with the present disclosure. The antenna assembly 10 is configured for use in any suitable application, such as in conjunction with an adaptive cruise control system for a vehicle. The antenna assembly 10 may be configured for use with any other suitable automotive or non-automotive application as well.

The antenna assembly 10 generally includes a circuit board 20, a waveguide plate 30, and a conductive top plate 50. The circuit board 20, the waveguide plate 30, and the conductive top plate 50 are secured together in any suitable manner, such as with any suitable fasteners 12. The waveguide plate 30 is secured between the circuit board 20 and the conductive top plate 50.

The circuit board 20 includes an integrated circuit (IC) 22 configured to process radio frequency (RF) signals. Extending from the IC 22 are conductive traces 24, which are electrically connected to the IC 22. Conductive pads 26 are at distal ends of the traces 24. The pads 26 and the traces 24 are configured to electrically conduct RF signals to and from the IC 22.

Mounted over the circuit board 20 is the waveguide plate 30. The waveguide plate 30 defines a plurality of waveguides 32. The waveguides 32 extend from feeding holes 34. The feeding holes 34 are aligned with the pads 26 of the circuit board 20. RF signals transmitted from the IC 22 are conducted along the traces 24 to the pads 26, and through the feeding holes 34 of the waveguide plate 30 to the waveguides 32. Conversely, received RF signals are directed by the waveguides 32 to the feeding holes 34, and to the IC 22 by way of the pads 26 and the traces 24. Distal ends 36 of the waveguides 32 opposite to the feeding holes 34 are positioned and shaped to correspond with slots of the conductive top plate 50, as explained herein.

The conductive top plate 50 has an outer surface 52 and an inner surface 54. The outer surface 52 is opposite to the inner surface 54. The inner surface 54 faces the waveguide plate 30. The outer surface 52 is an outer surface of the antenna assembly 10. The conductive top plate 50 is made of any suitable conductive material, such as any suitable metallic material.

Figure 2:
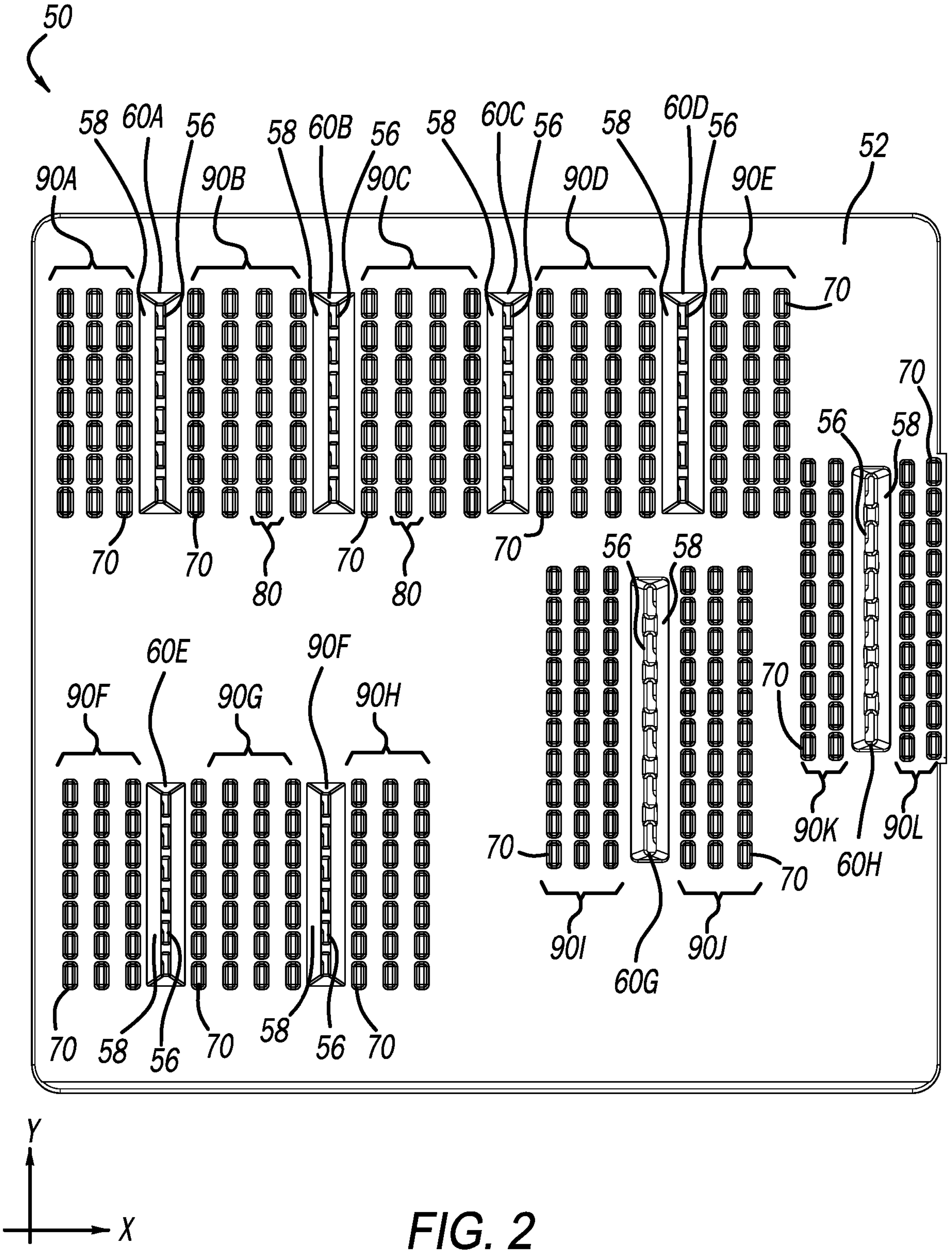
FIG. 2 is a plan view of an outer surface of a conductive top plate of the antenna assembly of FIG. 1.
Figure 3:
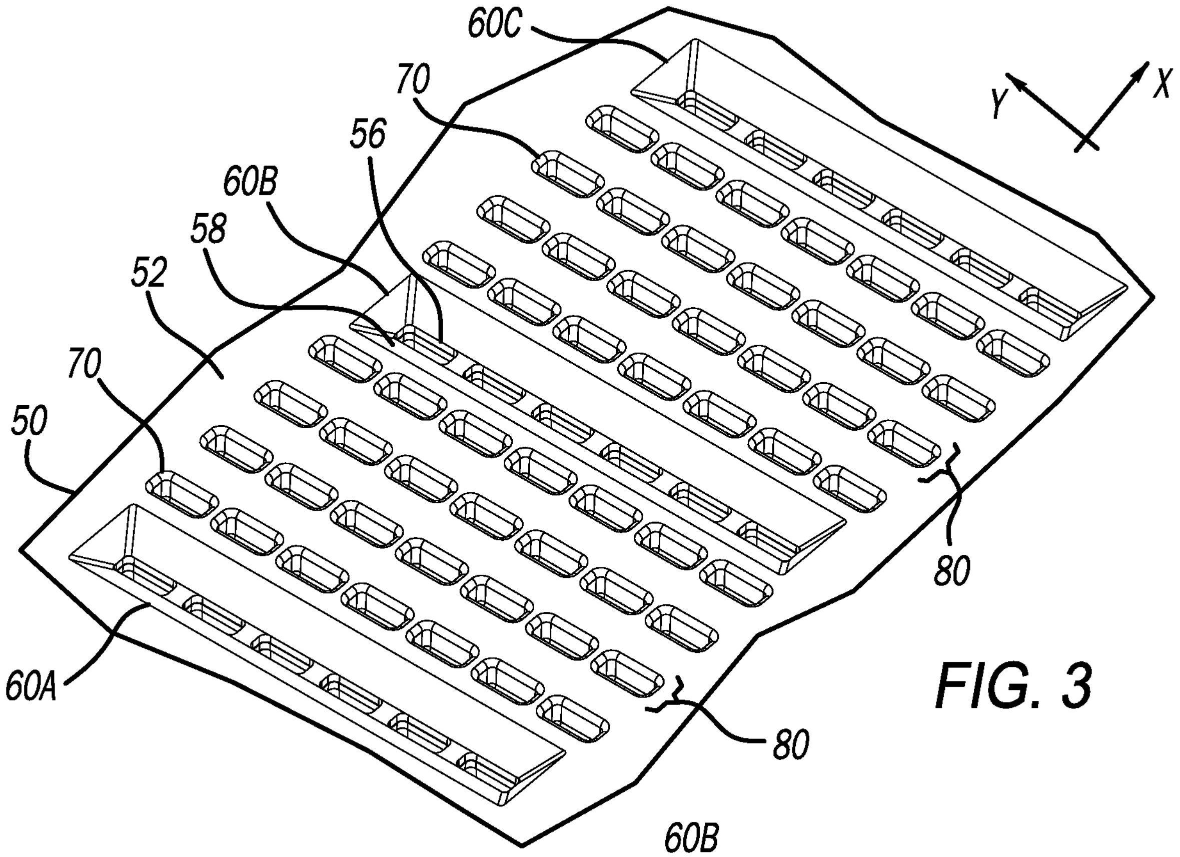
FIG. 3 is a perspective view of an area of the conductive top plate of FIG. 2.
Figure 4:
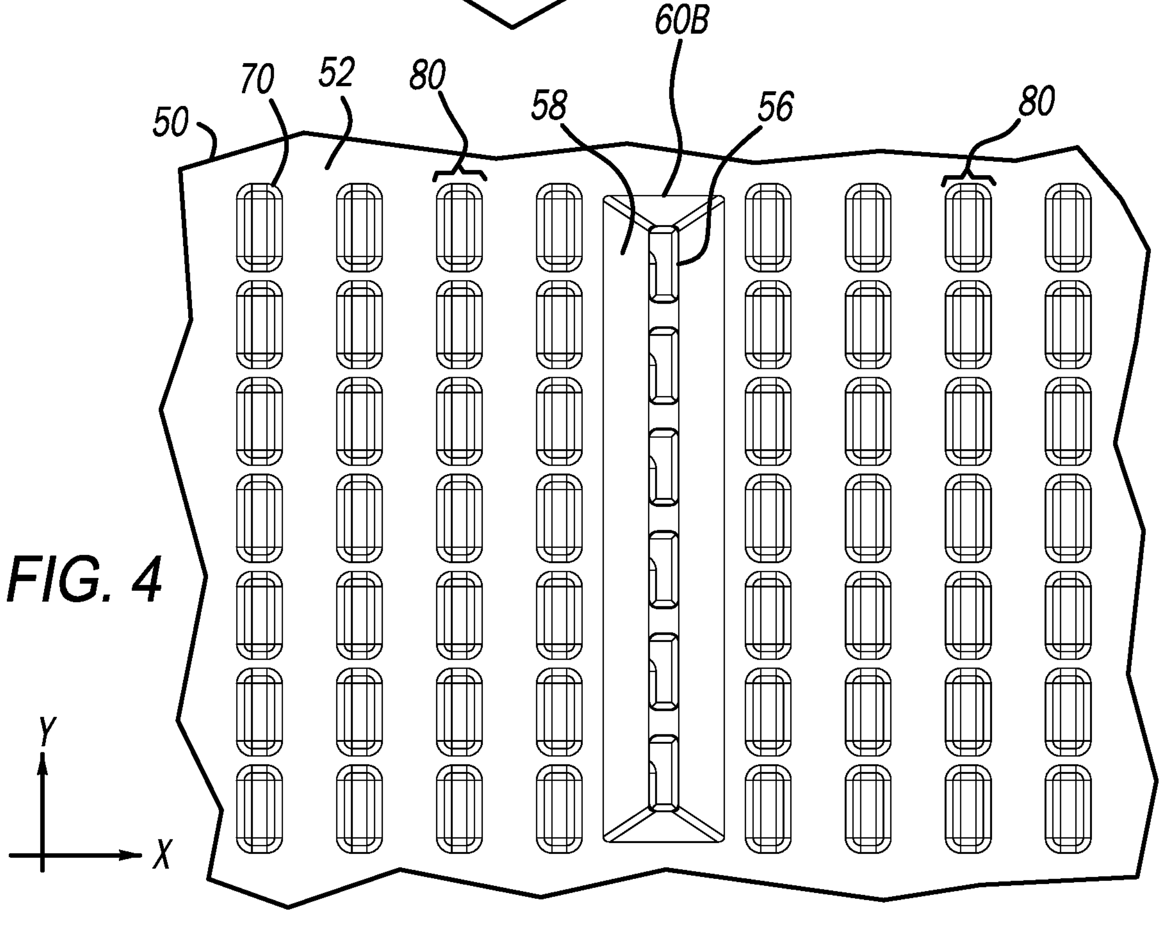
FIG. 4 is a plan view of an area of the conductive top plate of FIG. 2.

With continued reference to FIG. 1, and additional reference to FIGS. 2-4, the conductive top plate 50 defines a plurality of slots 56, which extend through the conductive top plate 50 to the waveguide plate 30. The slots 56 are aligned with the distal ends 36 of the waveguides 32. The slots 56 are configured to direct received RF signals to the distal ends 36 of the waveguides 32 and/or direct RF signals away from the distal ends 36 of the waveguides 32 during RF transmission. To facilitate receiving and/or transmitting RF signals, the conductive top plate 50 defines sloped surfaces 58 adjacent to the plurality of slots 56. The sloped surfaces 58 extend from the outer surface 52 into the conductive top plate 50 towards the slots 56.

The plurality of slots 56 are arranged in various groups, each of which is an antenna configured to receive and/or transmit RF signals based on the configuration of the IC 22. The conductive top plate 50 may include any suitable number of groups of the slots 56. In the example illustrated, the conductive top plate 50 includes eight groups: a first group 60A; a second group 60B; a third group 600; a fourth group 60D; a fifth group 60E; a sixth group 60F; a seventh group 60G; and an eighth group 60H. Each one of the groups 60A-60H includes a plurality of the slots 56, such as six of the slots 56 in the example illustrated. Each one of the groups 60A-60H is aligned in a first direction along the conductive top plate 50. In the example of FIG. 2, the first direction is along the Y-axis (Y-direction). Although eight groups 60A-60H are illustrated, the conductive top plate 50 may include any suitable number of groups of the slots 56.

Each one of the groups 60A-60D of the slots 56 may be configured as a transmitting antenna, a receiving antenna, or a transceiver antenna. For example, the groups 60A-60D may be configured as transmitting antennas, and the groups 60E-60H may be configured as receiving antennas. Alternatively, the groups 60E-60H may be configured as transmitting antennas, and the groups 60A-60D may be configured as receiving antennas.

The conductive top plate 50 further includes a plurality of cavities 70 defined by the conductive top plate 50 and recessed below the outer surface 52 of the top plate 50. The cavities 70 are configured to modify the RF signals transmitted from, or received by, the plurality of slots 56, as explained herein. The cavities 70 are arranged in rows 80 beside the plurality of slots 56. The cavities 70 of each row 80 are aligned in the Y-direction parallel to the plurality of slots 56, and the cavities 70 of each row 80 are spaced apart in the Y-direction. The rows 80 of the cavities 70 are spaced part along an X-axis (X-direction), which is perpendicular to the Y-axis. Each one of the cavities 70 is offset from each slot 56 in the X-direction such that the slots 56 are unaligned with the cavities 70 in the X-direction.

Figure 5:
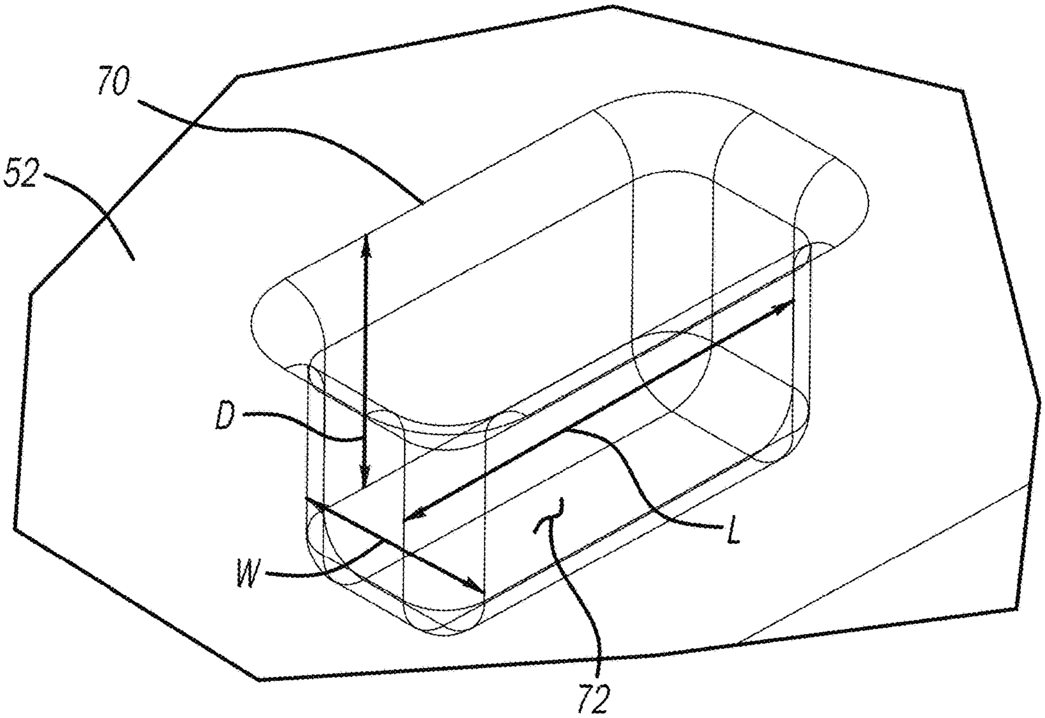
FIG. 5 is a perspective view of a cavity of the conductive top plate of FIG. 2.

With reference to FIG. 5, each one of the cavities 70 includes a length L extending in the Y-direction, a width W extending in the X-direction, and a depth D extending in a Z-direction. Each one of the cavities 70 includes a bottom surface 72, which is between the outer surface 52 and the inner surface 54 of the conductive top plate 50. The width W is perpendicular to the length L, and the depth D is perpendicular to the length L and the width W. The length L may be 2.4 mm, for example, or about 2.4 mm. Additional exemplary lengths L include, but are not limited to, the following: 2.1 mm, 2.4 mm, and 2.7 mm. The depth D may be 1.35 mm, for example, or about 1.35 mm. Additional exemplary depths D include, but are not limited to, the following: 1.25 mm, 1.45 mm, 1.65 mm, and 1.85 mm. The width may be 1.0 mm, for example, or about 1.0 mm.

The cavities 70 of each row 80 are spaced apart in the Y-direction at any suitable distance or pitch, such as 3.2 mm or about 3.2 mm, for example, as measured between mid-points along lengths L of adjacent cavities 70. Additional exemplary pitches in the Y-direction include, but are not limited to, 3.0 mm, 3.5 mm, and 4.0 mm. The rows 80 of the cavities 70 are spaced apart in the X-direction at any suitable distance or pitch, such as 3.3 mm or about 3.3 mm, for example, as measured between mid-points along widths W of adjacent cavities 70 of adjacent rows 80. Additional exemplary pitches in the X-direction include, but are not limited to, 2.7 mm, 3.1 mm, 3.3 mm, 3.5 mm, and 3.8 mm.

The rows 80 of the cavities 70 are arranged in various groups. Any suitable number of the rows 80 may be included in any suitable number of groups. In the example of FIG. 2, the conductive top plate 50 includes the following groups of the rows 80: a first row group 90A; a second row group 90B, a third row group 90C, a fourth row group 90D, a fifth row group 90E, a sixth row group 90F, a seventh row group 90G, an eighth row group 90H, a ninth row group 90I, a tenth row group 90J, an eleventh row group 90K, and a twelfth row group 90L. The row groups 90A-90L are adjacent to the groups 60A-60H of the slots. The row groups 90A-90L may be on only one side of slots 56, or on both sides of the plurality of slots 56. Each row group 90A-90L may include any suitable number of the rows 80, such as three or four, for example. And each row 80 may include any suitable number of cavities 70, such as seven, for example.

Figure 6:
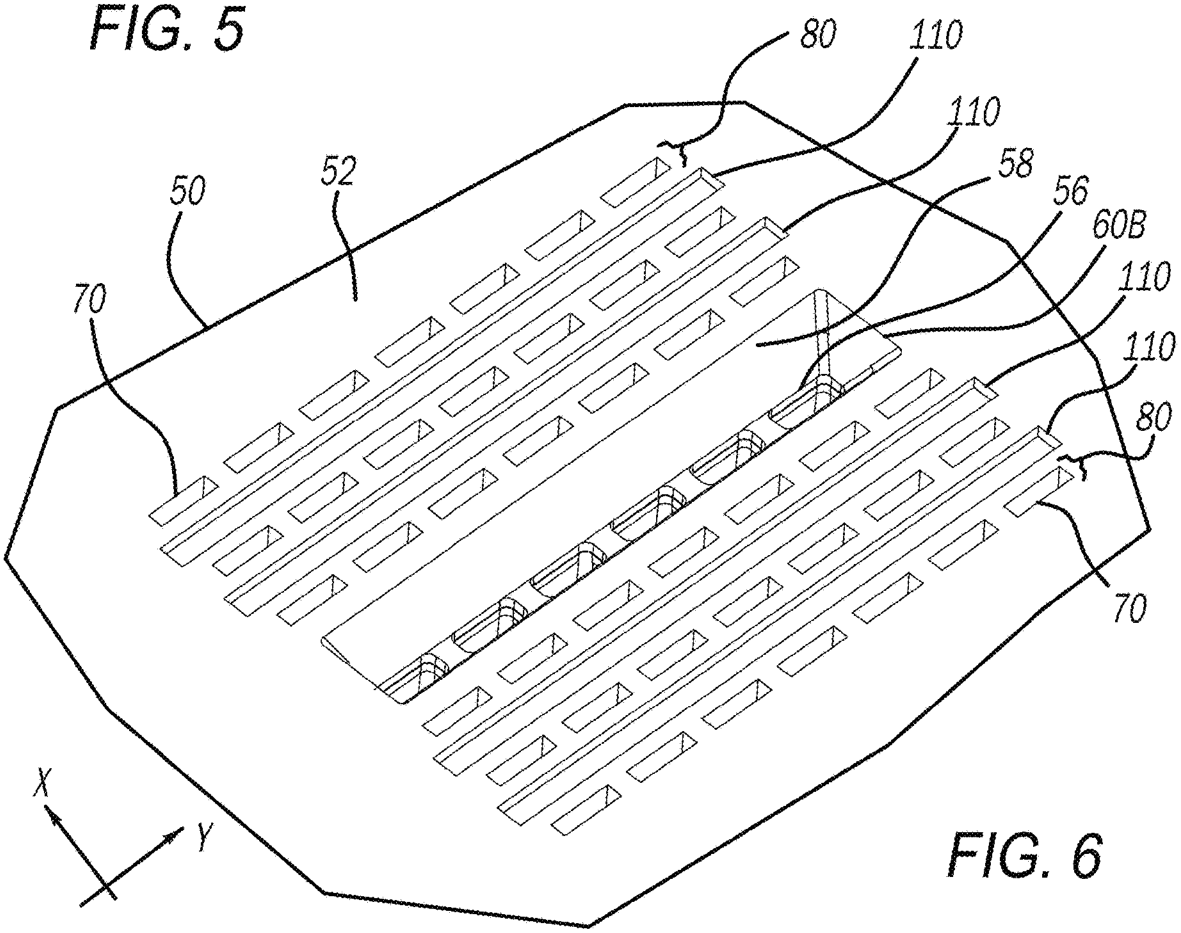
FIG. 6 is a perspective view of an area of an additional conductive top plate in accordance with the present disclosure.
Figure 7:
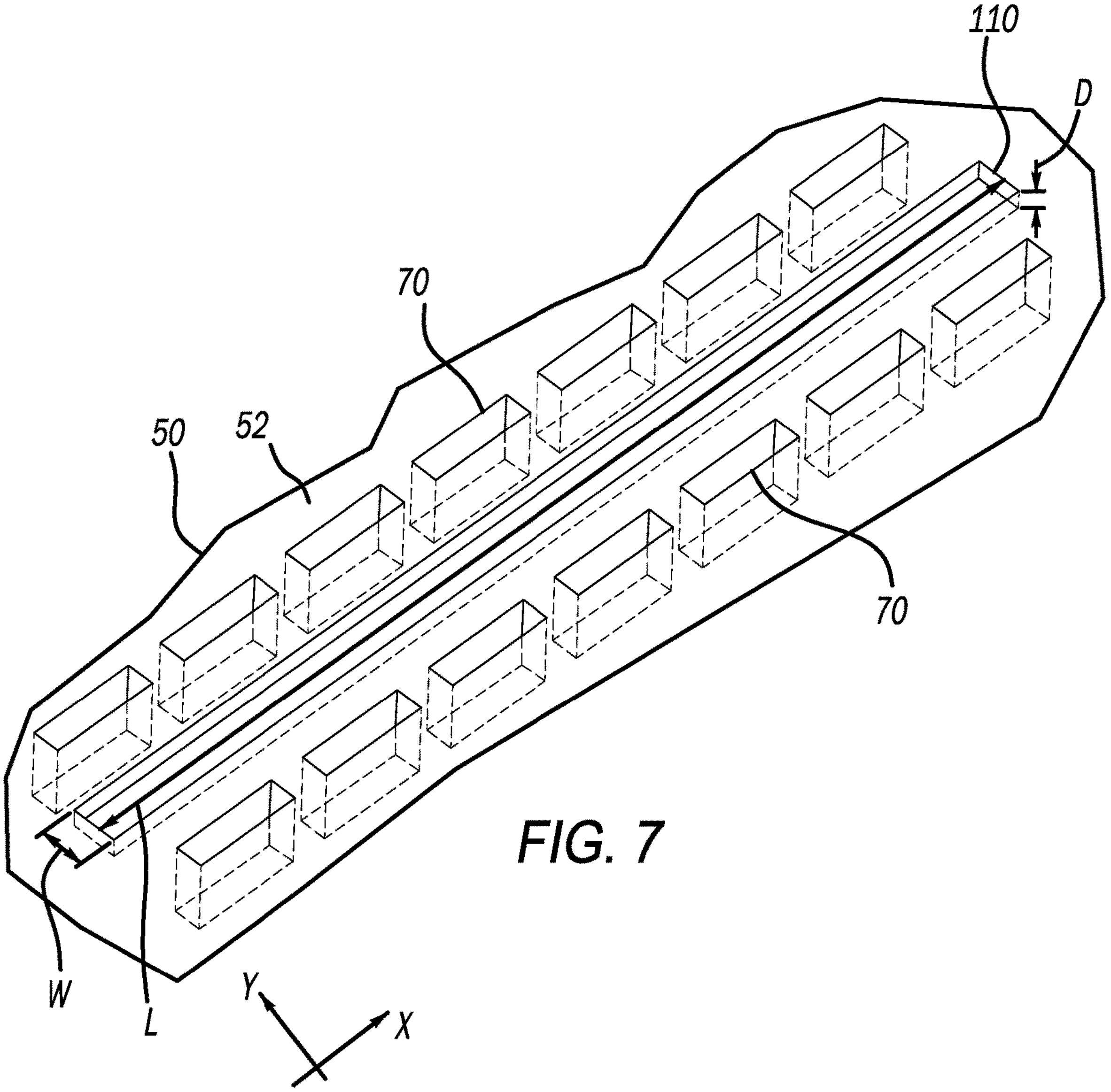
FIG. 7 is a perspective view of cavities and a trough of the conductive top plate of FIG. 6.

With reference to FIGS. 6 and 7, in some applications the conductive top plate 50 may further define troughs 110 recessed below the outer surface 52. Each one of the troughs 110 extends in the Y-direction and is between adjacent ones of the rows 80 of the cavities 70. Each trough 110 includes a length L extending in the Y-direction parallel to the rows 80 and the slots 56, a width W extending in the X-direction, and a depth D extending in the Z-direction. Each trough 110 may be provided with any suitable length L, width W, and depth D dimensions. For example, the length L may be 23 mm, or about 23 mm. The width W may be 0.8 mm, or about 0.8 mm. Other suitable widths W include, but are not limited to, 0.7 mm and 0.9 mm or widths approximate thereto. And the depth D may be 0.4 mm, or about 0.4 mm. Other suitable depths D include, but are not limited to, 0.5 mm and 0.6 mm or depths approximate thereto.

The troughs 110 are configured as parasitic bridges that artificially compress spacing between the rows 80 of the cavities 70 in the X-direction, which allows the conductive top plate 50 to be made smaller and more compact. For example and with respect to the configurations of FIGS. 6 and 7, the rows 80 may be spaced apart in the X-direction at a pitch of 2.75 mm.

The dimensions of the cavities 70 and troughs 110 may be customized to generate a radiation pattern of a custom width and total gain to fit any suitable application. For example, the depth D, the length L, and the width W of each cavity 70 and trough 110 may be varied, the pitch between rows 80 in the X-direction may be varied, and the pitch between cavities 70 in the Y-direction may be varied to arrive at a custom radiation pattern. FIGS. 8-13 illustrate various exemplary radiation patterns of the antenna assembly 10 arrived at by varying such dimensions.

Figure 8:
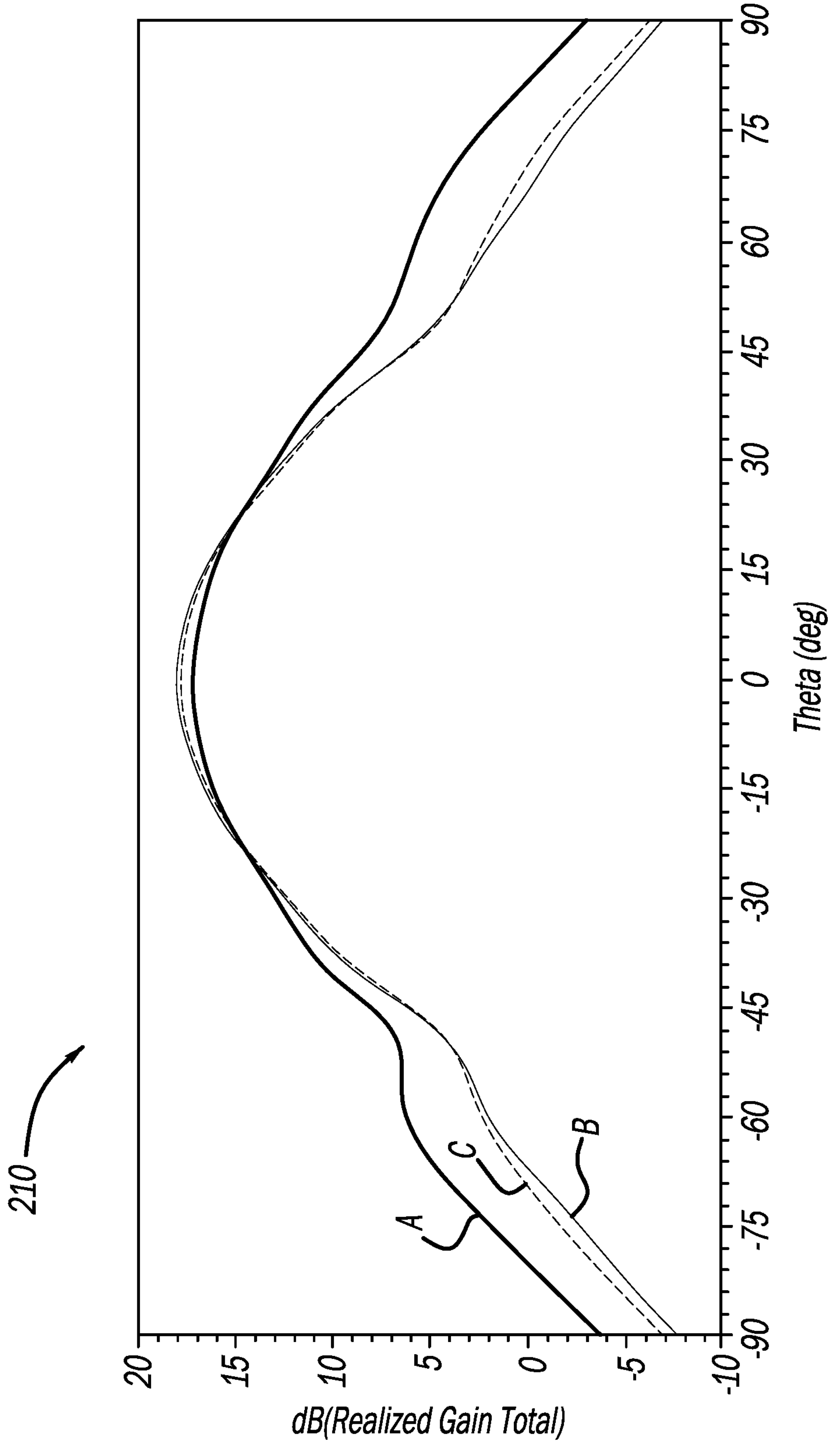
FIG. 8 is a graph illustrating exemplary radiation patterns of various antenna assemblies in accordance with the present disclosure that differ with respect to pitch in a y-direction of cavities defined by the conductive top plate.

FIG. 8 is a graph 210 illustrating radiation patterns of three antenna assemblies 10 in accordance with the present disclosure, which differ with respect to pitch between cavities 70 of each row 80 in the Y-direction. The radiation patterns are representative of the tunability of the antenna assembly 10. Radiation pattern A is representative of the antenna assembly 10 configured with the cavities 70 of each row 80 spaced apart in the Y-direction at a pitch of 3.0 mm. Radiation pattern B is representative of the antenna assembly 10 configured with the cavities 70 of each row 80 spaced apart in the Y-direction at a pitch of 3.5 mm. And radiation pattern C is representative of the antenna assembly 10 configured with the cavities 70 of each row 80 spaced apart in the Y-direction at a pitch of 4.0 mm. The radiation pattern A has the widest azimuth field of view, but the lowest gain at the center. The radiation patterns B and C each have a higher gain at the center as compared to radiation pattern A, but a more narrow azimuth field of view relative to the radiation pattern A.

Figure 9:
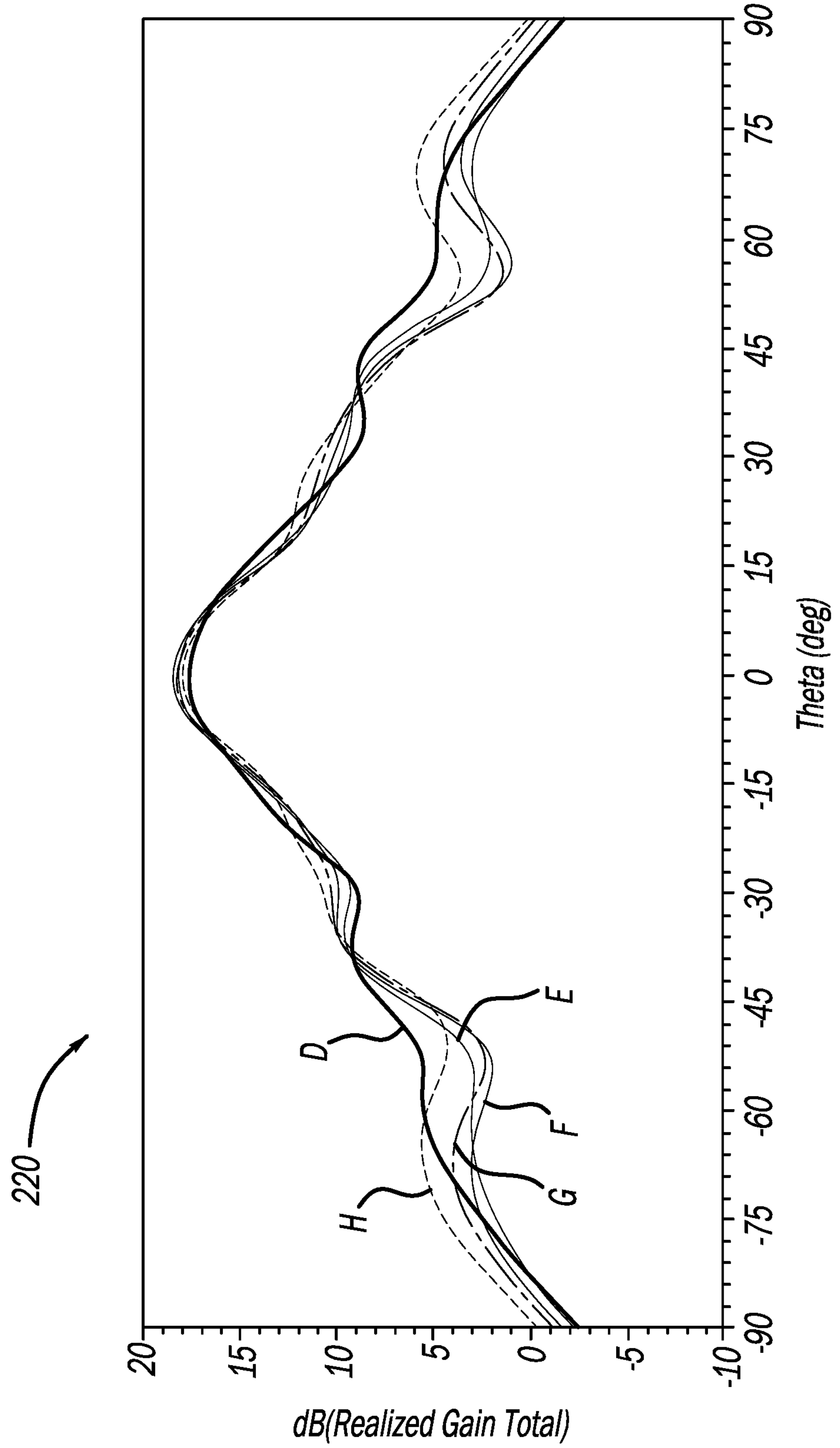
FIG. 9 is a graph illustrating exemplary radiation patterns of various antenna assemblies in accordance with the present disclosure that differ with respect to pitch in an x-direction of cavities defined by the conductive top plate.

FIG. 9 is a graph 220 illustrating radiation patterns of five antenna assemblies 10 in accordance with the present disclosure, which differ with respect to pitch between rows 80 of the cavities 70 in the X-direction. The radiation patterns are further representative of the tunability of the antenna assembly 10. Radiation pattern D is representative of the antenna assembly 10 configured with the rows 80 spaced apart in the X-direction at a pitch of 2.7 mm. Radiation pattern E is representative of the antenna assembly 10 configured with the rows 80 spaced apart in the X-direction at a pitch of 3.1 mm. Radiation pattern F is representative of the antenna assembly 10 configured with the rows 80 spaced apart in the X-direction at a pitch of 3.3 mm. Radiation pattern G is representative of the antenna assembly 10 configured with the rows 80 spaced apart in the X-direction at a pitch of 3.5 mm. Radiation pattern H is representative of the antenna assembly 10 configured with the rows 80 spaced apart in the X-direction at a pitch of 3.8 mm. The radiation pattern H has the widest field of view. Radiation pattern F has the highest gain at the center, and a relatively wide azimuth field of view. In some applications, the radiation pattern F with the rows 80 spaced apart in the X-direction at a pitch of 3.3 may be considered to be optimal.

Figure 10:
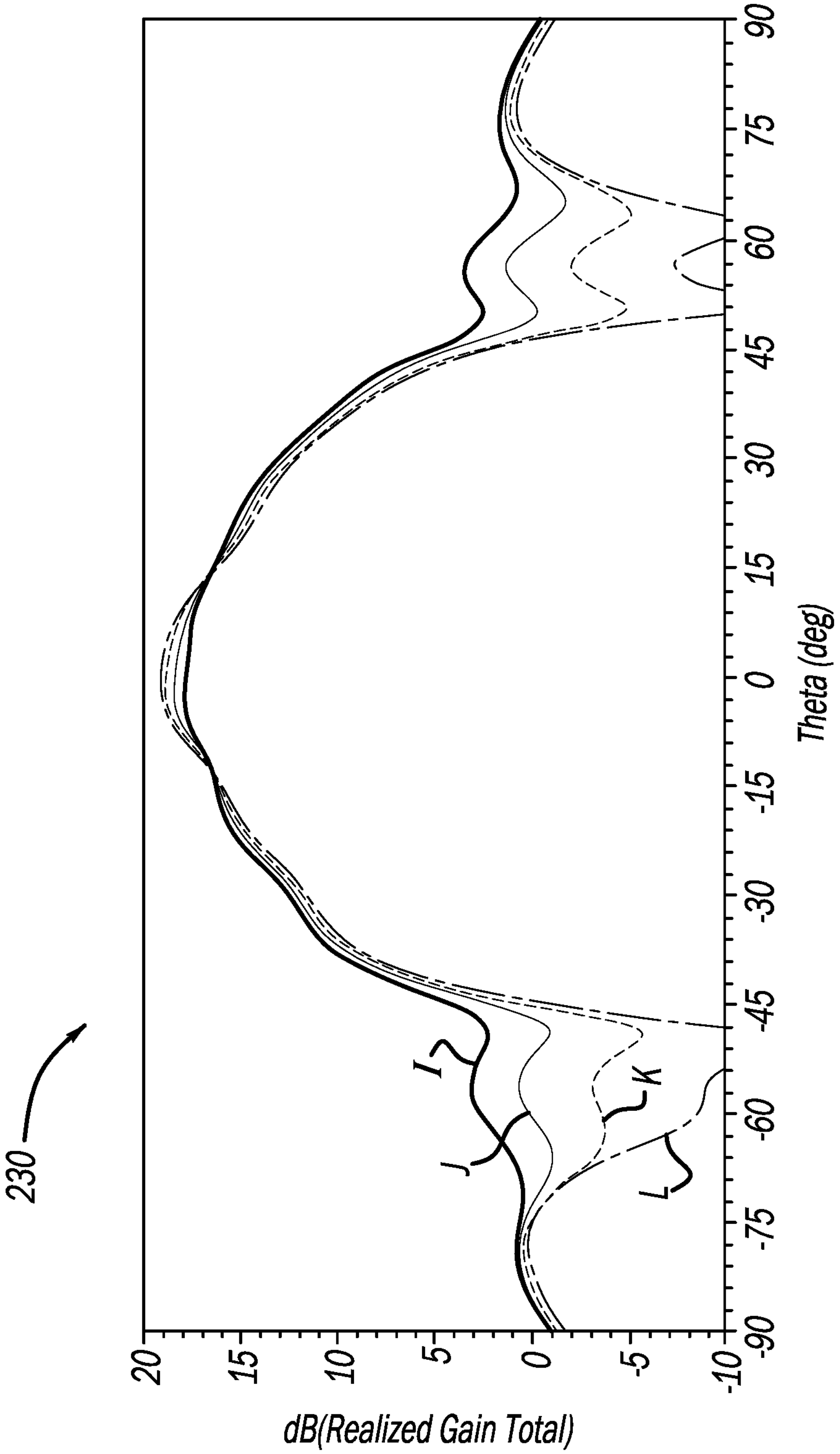
FIG. 10 is a graph illustrating exemplary radiation patterns of various antenna assemblies in accordance with the present disclosure that differ with respect to cavity depth.

FIG. 10 is a graph 230 illustrating radiation patterns of four antenna assemblies 10 in accordance with the present disclosure, which differ with respect to depth D of the cavities 70. In this example, the cavities 70 have a uniform length of 2.4 mm, a uniform width of 1.0 mm, and the cavities 70 of each row 80 are spaced apart in the Y-direction at a pitch of 3.1 mm. Radiation pattern I is representative of the antenna assembly 10 configured with cavities 70 extending to a uniform depth D of 1.25 mm. Radiation pattern J is representative of the antenna assembly 10 configured with cavities 70 extending to a uniform depth D of 1.45 mm. Radiation pattern K is representative of the antenna assembly 10 configured with cavities 70 extending to a uniform depth D of 1.65 mm. Radiation pattern L is representative of the antenna assembly 10 configured with cavities 70 extending to a uniform depth D of 1.85 mm. As shown in the exemplary graph 230, deepening the cavities 70 in the Z-direction results in a narrower azimuth field of view, but higher peak gain. Thus, the most shallow cavity depth of 1.25 mm (radiation pattern I) provides the widest azimuth field of view and lowest peak gain, while the deepest cavity depth of 1.85 mm (radiation pattern L) provides the most narrow azimuth field of view and highest peak gain.

Figure 11:
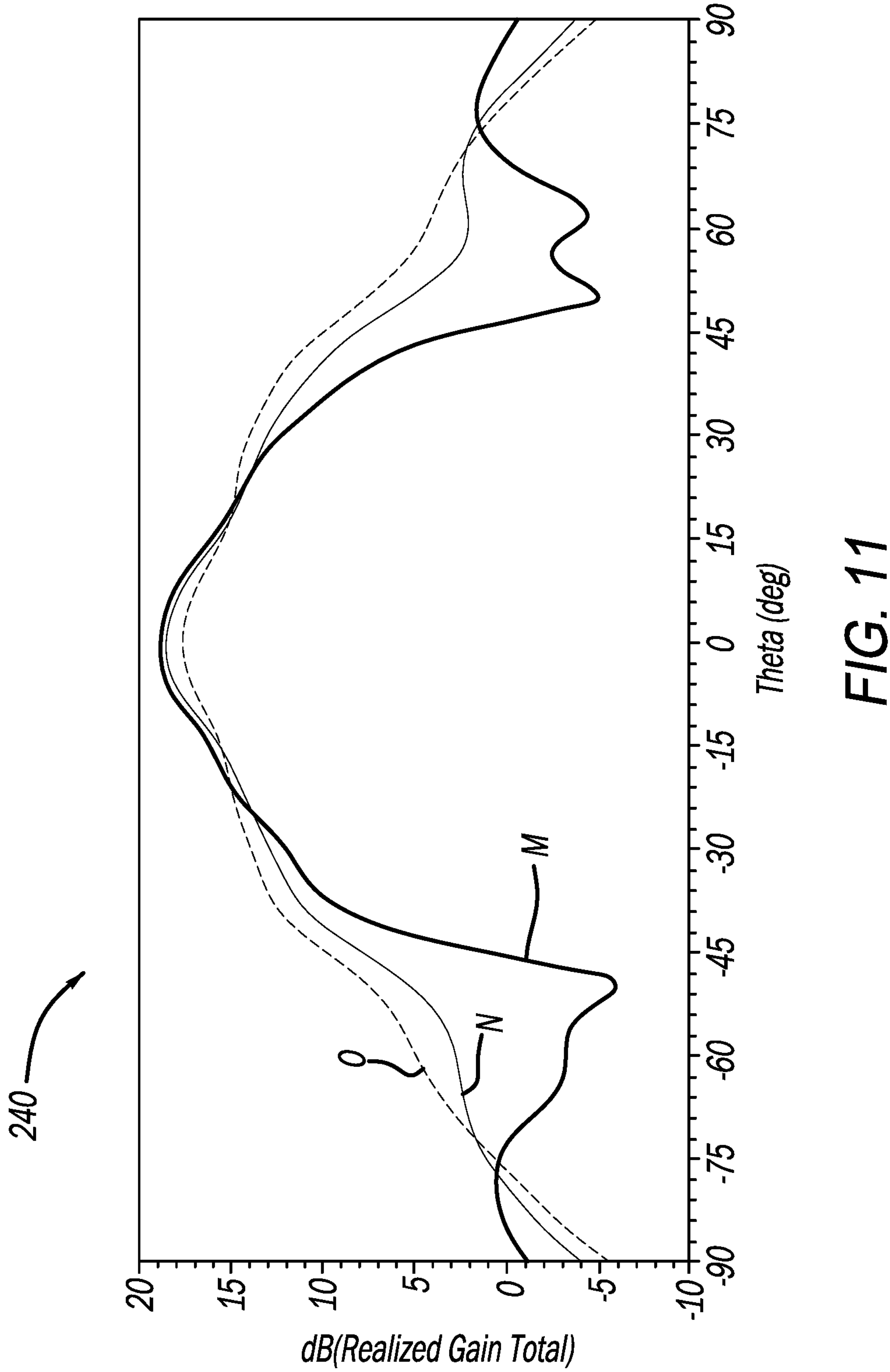
FIG. 11 is a graph illustrating exemplary radiation patterns of various antenna assemblies in accordance with the present disclosure that differ with respect to cavity length.

FIG. 11 is a graph 240 illustrating radiation patterns of three antenna assemblies 10 in accordance with the present disclosure, which differ with respect to length L of the cavities 70 in the Y-direction. The cavities 70 have a uniform depth of 1.65 mm, a uniform width of 1.0 mm, and the cavities 70 of each row 80 are spaced apart in the Y-direction at a pitch of 3.8 mm. Radiation pattern M is representative of the antenna assembly 10 configured with cavities 70 having a uniform length L of 2.10 mm. Radiation pattern N is representative of the antenna assembly 10 configured with cavities 70 having a uniform length L of 2.40 mm. Radiation pattern O is representative of the antenna assembly 10 configured with cavities 70 having a uniform length L of 2.70 mm. As shown in the exemplary graph 240, in general, longer cavities 70 provide decreased peak gain, but wider azimuth field of view.

Figure 12:
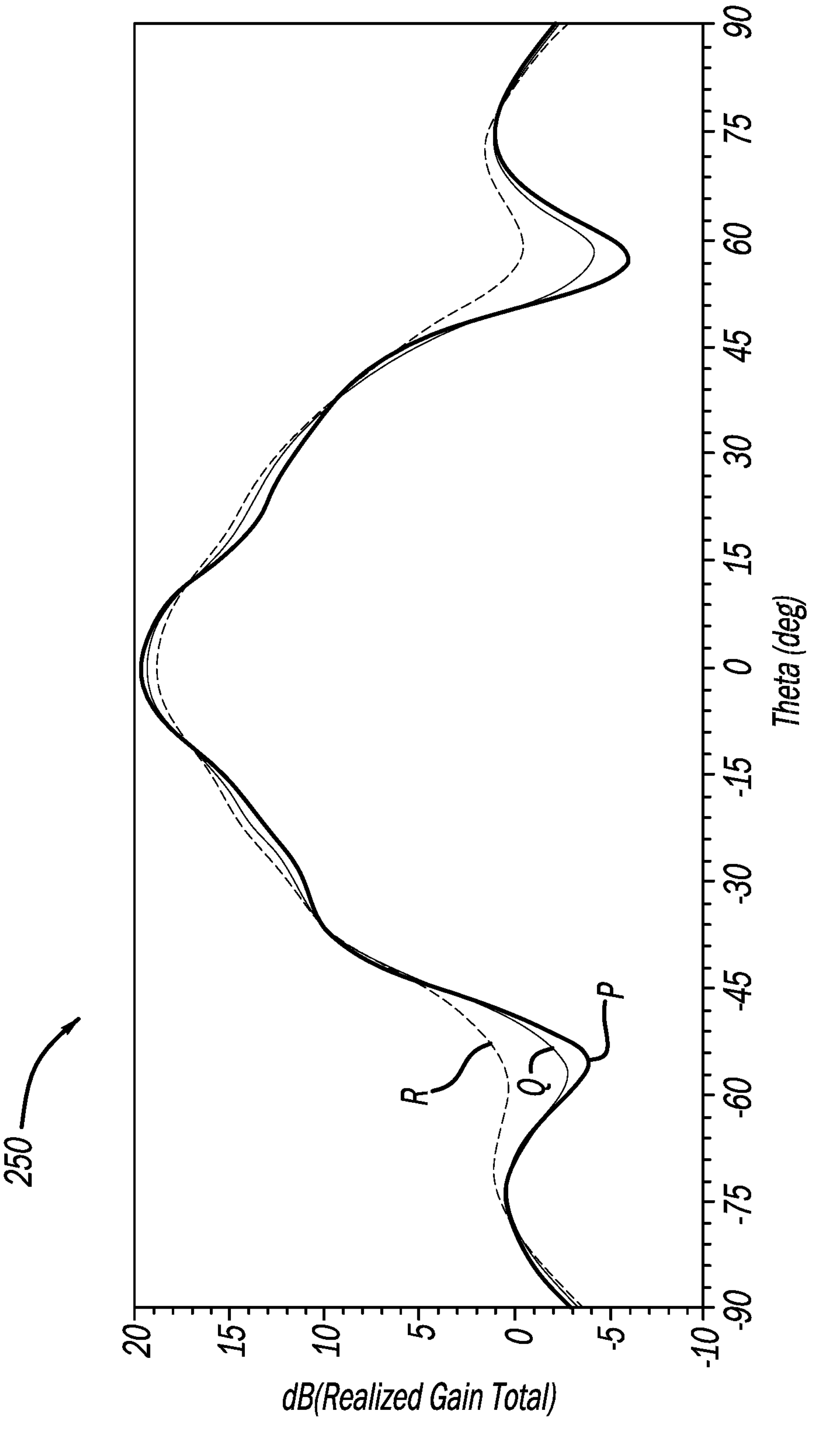
FIG. 12 is a graph illustrating exemplary radiation patterns of various antenna assemblies in accordance with the present disclosure that differ with respect to trough depth.

FIG. 12 is a graph 250 illustrating radiation patterns of three antenna assemblies 10 in accordance with the present disclosure including the troughs 110 between adjacent rows 80 of the cavities 70 (as illustrated in FIGS. 6 and 7, for example). The cavities 70 have a uniform length of 2.4 mm, a uniform depth of 1.45 mm, and a uniform width of 1.0 mm. The cavities 70 of each row 80 are spaced apart in the Y-direction at a pitch of 3.8 mm. The troughs 110 have a uniform length of 23.0 mm and width of 0.8 mm. The radiation pattern P is representative of the antenna assembly 10 configured with the troughs 110 having a uniform depth of 0.4 mm. The radiation pattern Q is representative of the antenna assembly 10 configured with the troughs 110 having a uniform depth of 0.5 mm. The radiation pattern R is representative of the antenna assembly 10 configured with the troughs 110 having a uniform depth of 0.6 mm. As shown in the exemplary graph 250, in general, deeper troughs 110 provide decreased peak gain, but a wider azimuth field of view.

Figure 13:
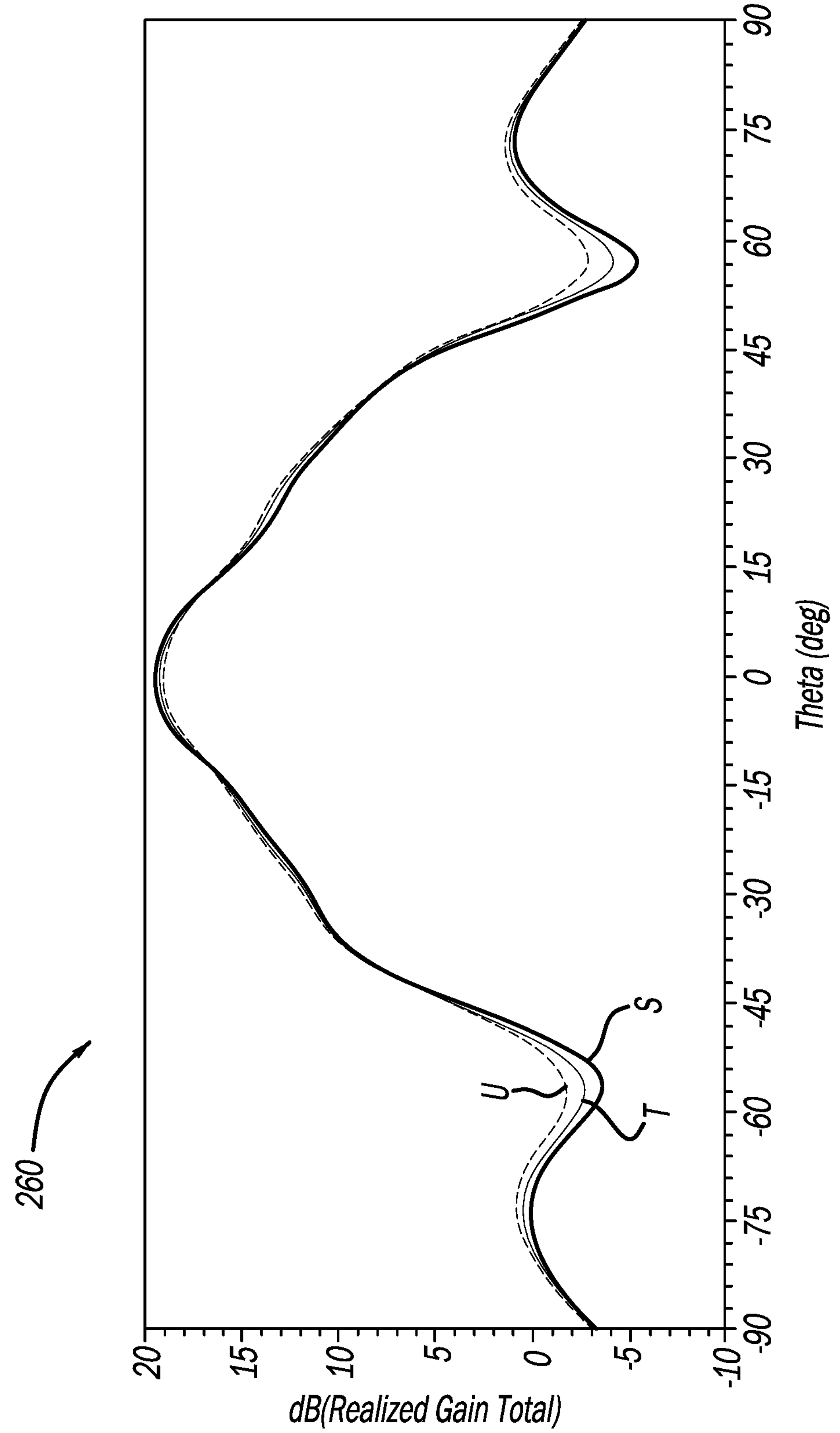
FIG. 13 is a graph illustrating exemplary radiation patterns of various antenna assemblies in accordance with the present disclosure that differ with respect to trough width.

FIG. 13 is a graph 260 illustrating radiation patterns of three antenna assemblies 10 in accordance with the present disclosure including the troughs 110 between adjacent rows 80 of the cavities 70 (as illustrated in FIGS. 6 and 7, for example). The cavities 70 have a uniform length of 2.4 mm, a uniform depth of 1.45 mm, and a uniform width of 1.0 mm. The cavities 70 of each row 80 are spaced apart in the Y-direction at a pitch of 3.8 mm. The troughs 110 have a uniform length of 23.0 mm and depth of 0.5 mm. The radiation pattern S is representative of the antenna assembly 10 configured with the troughs 110 having a uniform width of 0.7 mm. The radiation pattern T is representative of the antenna assembly 10 configured with the troughs 110 having a uniform width of 0.8 mm. The radiation pattern U is representative of the antenna assembly 10 configured with the troughs 110 having a uniform width of 0.9 mm. As shown in the exemplary graph 260, in general, wider troughs 110 provide decreased peak gain, but a wider azimuth field of view.

The present disclosure thus advantageously provides for the antenna assembly 10 with a top plate 50 that may be modified to customize the radiation pattern. In particular, the cavities 70 and the troughs 110 are configured to control surface waves at the outer surface 52 of the top plate 50. The cavities 70 and the troughs 110 may be modified to customize the radiation pattern. For example, the cavities 70 may be provided with various heights, widths, and depths. Spacing of the cavities 70 in the Y-direction may also be varied, and spacing of rows 80 of the cavities 70 may be varied in the X-direction. The troughs 110 may also be varied in height, width, and depth. The antenna assembly 10 may thus advantageously be "fine-tuned" to generate a radiation pattern suitable for a particular application, such as any of the radiation patterns of FIGS. 8-13.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An antenna assembly comprising:
- a circuit board including an integrated circuit configured to process a radio frequency (RF) signal, and a conductive trace extending from the integrated circuit;
- a waveguide plate over the circuit board, the waveguide plate including a waveguide configured to guide the RF signal at least one of to and from the conductive trace; and
- a conductive top plate over the waveguide plate, the conductive top plate including,
  - an outer surface and an inner surface facing the waveguide plate, the outer surface is opposite to the inner surface,
  - a plurality of slots aligned with the waveguide and extending through the conductive top plate, the plurality of slots aligned along the conductive top plate in a Y-direction, and
  - cavities defined by the conductive top plate and recessed below the outer surface of the conductive top plate, each one of the cavities including a bottom surface between the outer surface and the inner surface of the conductive top plate, a row of the cavities is beside the plurality of slots, the cavities of the row are aligned in the Y-direction parallel to the plurality of slots and spaced apart in the Y-direction.

2. The antenna assembly of claim 1, wherein,
- the row of the cavities is a first row on a first side of the plurality of slots, and
- the antenna assembly further includes a second row of the cavities on a second side of the plurality of slots that is opposite to the first side, the cavities of the second row are aligned in the Y-direction parallel to the plurality of slots and spaced apart in the Y-direction.

3. The antenna assembly of claim 1, wherein the cavities are spaced apart in the Y-direction at a pitch of 3.2 mm.

4. The antenna assembly of claim 1, wherein,
- the row of the cavities is one of a plurality of first rows of the cavities on a first side of the plurality of slots, the plurality of first rows are spaced apart in an X-direction that is perpendicular to the Y-direction, and
- the antenna assembly further includes a plurality of second rows of the cavities on a second side of the plurality of slots that is opposite to the first side, the plurality of second rows are spaced apart in the X-direction that is perpendicular to the Y-direction.

5. The antenna assembly of claim 4, wherein the plurality of first rows are spaced apart in the X-direction at a pitch of 3.3 mm.

6. The antenna assembly of claim 4, further comprising a first trough between two of the plurality of first rows, the first trough extending in the Y-direction.

7. The antenna assembly of claim 6, wherein the plurality of first rows are spaced apart in the X-direction at a pitch of 2.75 mm.

8. The antenna assembly of claim 6, wherein the first trough has a length in the Y-direction of 23 mm, a width in the X-direction of 0.8 mm, and a depth in a Z-direction of 0.4 mm.

9. The antenna assembly of claim 6, further comprising a second trough between two of the plurality of second rows, the second trough extending in the Y-direction.

10. The antenna assembly of claim 9, wherein the cavities of each one of the plurality of first rows are spaced apart in the Y-direction, and the cavities of each one of the plurality of second rows are spaced apart in the Y-direction.

11. The antenna assembly of claim 1, wherein, each one of the cavities has a length in the Y-direction, a width in an X-direction that is perpendicular to Y-direction, and a depth in a Z-direction, the length is greater than the width, and the depth is less than the length and greater than the width.

12. The antenna assembly of claim 1, wherein, the waveguide is a first waveguide and the plurality of slots is a first plurality of slots, the conductive top plate further includes a second plurality of slots aligned parallel to the first plurality of slots in the Y-direction over a second waveguide of the waveguide plate, and an additional row of the cavities is beside the second plurality of slots, the cavities of the additional row are aligned in the Y-direction parallel to the second plurality of slots and spaced apart in the Y-direction.

13. An antenna assembly comprising:

a circuit board including an integrated circuit configured to process a radio frequency (RF) signal, and a conductive trace extending from the integrated circuit;

a waveguide plate over the circuit board, the waveguide plate including a waveguide configured to guide the RF signal at least one of to and from the conductive trace; and a conductive top plate over the waveguide plate, the conductive top plate including, an outer surface and an inner surface facing the waveguide plate, the outer surface is opposite to the inner surface, a plurality of slots aligned with the waveguide and extending through the conductive top plate, the plurality of slots aligned along the conductive top plate in a Y-direction, and cavities defined by the conductive top plate and recessed below the outer surface of the conductive top plate, each one of the cavities including a bottom surface between the outer surface and the inner surface of the conductive top plate, rows of the cavities are beside the plurality of slots on opposite sides of the plurality of slots, the cavities of each one of the rows are aligned in the Y-direction parallel to the plurality of slots and spaced apart in the Y-direction, the rows are spaced apart in an X-direction that is perpendicular to the Y-direction, each slot of the plurality of slots is unaligned with the cavities in the X-direction.

14. The antenna assembly of claim 13, wherein the cavities are spaced apart in the Y-direction at a pitch of 3.2 mm.

15. The antenna assembly of claim 13, wherein, each one of the cavities has a length in the Y-direction, a width in an X-direction that is perpendicular to Y-direction, and a depth in a Z-direction, the length is greater than the width, and the depth is less than the length and greater than the width.

16. The antenna assembly of claim 15, wherein the length is more than twice the width.

17. An antenna assembly comprising:

a circuit board including an integrated circuit configured to process a radio frequency (RF) signal, and a conductive trace extending from the integrated circuit;

a waveguide plate over the circuit board, the waveguide plate including a waveguide configured to guide the RF signal at least one of to and from the conductive trace; and a conductive top plate over the waveguide plate, the conductive top plate including, an outer surface and an inner surface facing the waveguide plate, the outer surface is opposite to the inner surface, a plurality of slots aligned with the waveguide and extending through the conductive top plate, the plurality of slots aligned along the conductive top plate in a Y-direction, cavities defined by the conductive top plate and recessed below the outer surface of the conductive top plate, rows of the cavities are beside the plurality of slots, the cavities of each one of the rows are aligned in the Y-direction parallel to the plurality of slots and spaced apart in the Y-direction, and each one of the rows is spaced apart in an X-direction that is perpendicular to the Y-direction, and troughs defined by the conductive top plate and recessed below the outer surface of the conductive top plate, each one of the troughs extends in the Y-direction and is between adjacent ones of the rows of the cavities.

18. The antenna assembly of claim 17, wherein the rows of the cavities are spaced apart in the X-direction at a pitch of 2.75 mm.

19. The antenna assembly of claim 18, wherein each one of the troughs has a length in the Y-direction of 23 mm, a width in the X-direction of 0.8 mm, and a depth in a Z-direction of 0.4 mm.

20. The antenna assembly of claim 17, wherein the rows of the cavities are on opposite sides of the plurality of slots.

* * * * *